Patented Jan. 22, 1946

2,393,269

UNITED STATES PATENT OFFICE 2,393,269

COAGULANT COMPOSITION FOR REMOVAL OF SUSPENDED OR DISSOLVED MATERIALS FROM LIQUIDS

Willem Rudolfs, Piscataway Township, Middlesex County, and Harry W. Gehm, Metuchen, N. J., assignors to The Permutit Company, New York, N. Y., a corporation of Delaware No Drawing. Application October 2, 1941, Serial No. 413,298

7 Claims. (Cl. 252—181)

This invention relates to the treatment of liquids such as sewage, trade wastes and similar aqueous liquids containing colloidal, suspended or dissolved matter which should be at least partially separated from the liquids. The invention relates more particularly to a new coagulant for treating such liquids, to the method of making the coagulant, and to methods of treating liquids therewith.

Metallic salts such as alum and ferric chloride have been used to coagulate and settle or render filterable the suspended matter in various liquids. In fact, ferric chloride is used extensively with sewage for this purpose, even though it is fairly expensive and objectionable because of its corrosiveness and for other reasons.

We have found that coagulating salts of the multivalent metals such as the chlorides of iron, aluminum, zinc, tin, titanium, chromium, manganese and copper when used in conjunction with various proteinous materials such as gelatine, glue or the like, are very effective coagulants. Such a combination produces equivalent clarification at lower cost compared with ferric chloride alone, or better results may be obtained at equal cost.

Although separate solutions of the metallic salt and proteinous material may be fed to the liquid to be treated, we have found that these ingredients may be used advantageously in a combined form. In general we have found that similar compound formation does not take place with other metal salts, e. g., sulfates or carbonates. Furthermore in such cases the mixtures of the metal salts with the protein materials still show some advantage over the use of the metal salts alone, but this advantage is not as great as that obtained by the use of the protein material metal chloride compounds.

For example, ferric chloride and gelatine may be combined to give a composition of matter in which the gelatine and ferric chloride apparently are chemically combined and which is highly effective as a coagulant and is very convenient for storage, transportation and use.

The quantity of ferric chloride required in this combination for the clarification of liquids such as sewage is substantially smaller than the quantity of ferric chloride that would be required when used alone, and a very rapid and effective formation and settling of floc is obtained. Also, a higher degree of clarification can be obtained with such a combination than is obtainable with economically practical dosages of straight ferric chloride.

Various proteinous materials such as glue, zein, gluten, casein and albumen may be substituted for the gelatine but we have found gelatine of commercial grade (not refined for use as food) to be most satisfactory from the standpoint of cost and efficiency. Some of the other proteinous materials, which generally must be used in their impure forms on account of cost, tend to clarify liquids imperfectly and/or contain inactive ingredients which dissolve in the liquid and contribute to its impurity. Glue, for instance, apparently contains protein degradation products which dissolve in the liquid, and is generally less efficient as a purifying agent in combination with the ferric chloride than is gelatine although it is generally second best of the available proteinous materials. It will be appreciated that such proteinous materials as are capable of use in combination with ferric chloride, in their impure or crude forms which are available for use in treating sewage and industrial wastes, vary widely in composition and such considerations may determine the particular proteinous material to be used in the clarification of a particular liquid at a particular time and place. Such other proteinous materials apparently owe their utility to their content of protein which is identical with or similar to that of gelatine.

Due to the wide variations in proteinous materials, including gelatine, available for use, and to the wide variations in the character of liquids requiring clarification, it is impossible to state a concise rule as to the best ratio of metallic salt to proteinous material and the best quantity of the composition to use for treating all liquids. The following disclosure is to be read and understood in the light of this situation. Those skilled in the arts of liquid clarification and sewage treatment appreciate the extreme variations encountered in practice and demand a highly flexible means for meeting special conditions. The following disclosure will not therefore be regarded by those skilled in the art as being lacking in specific and critical data.

Coagulants comprising a metallic salt such as ferric chloride in combination with a proteinous material may be prepared in various ways. For example, a suitable compound may be prepared by grinding together about 1 to 7 parts of dry gelatine and 5 parts of anhydrous ferric chloride with just sufficient water so that the compound can be kneaded to a uniform paste. The paste can be stored as such, evaporated to produce a dry product, or diluted with water to form a stable liquid product. A dilution such that one gallon of solution contains 0.25 lb. of iron is satisfactory.

A suitable compound or composition may also be prepared by simply mixing gelatine and ferric chloride in the presence of water. Solutions of ferric chloride and gelatine may be simply mixed to produce a solution of the composition ready for use. The concentrations of the solutions are not critical but we prefer substantially saturated solutions. Dilute solutions are inconvenient for storage and shipment, and highly dilute solutions are not stable in storage.

Compositions prepared by simply mixing solutions of the gelatine and ferric chloride may be concentrated by evaporation and even reduced to dryness but for the production of a dry composition we prefer to grind the gelatine and anhydrous ferric chloride together in the presence of only sufficient water to moisten the mixture. The product may be dried in the air or by the application of heat and powdered or flaked for convenience in handling and ready solubility. When the gelatine and ferric chloride are ground together heat is evolved and a solution of the product in water exhibits freezing points and vapor pressure changes, pH characteristics, speed of solubility, and other characteristics, all of which indicate that the ferric chloride and gelatine have entered into chemical combination. In fact, the ferric chloride is less corrosive in this combination and cannot be separated by washing out of the product with cold water as it could be if it were simply mixed and not combined with the proteinous material.

As stated above, the proportions in which the proteinous material and metallic salt may be combined vary within a wide range. Gelatine has been found to be effective when combined with ferric chloride in proportions as low as 1 part by weight of dry gelatine to 5 parts by weight of anhydrous ferric chloride and possibly even a smaller proportion of gelatine may be effective under some circumstances. Ordinarily, however, the ratio of gelatine to ferric chloride should not be less than 1 to 3 and the customary range is 1 part of gelatine to from 1 to 2 parts of ferric chloride. On the other hand, it is not considered practical or economical to combine more than about 4 parts of gelatine with 3 parts of ferric chloride. The best proportions for gelatine and ferric chloride appear to be 2 parts gelatine to 3 parts ferric chloride. This combination is definitely superior with respect to stability, lack of corrosiveness, solubility in water, and ability to dry well and remain as a dry product without taking up water.

In general, the proteinous material, when combined with ferric chloride, should be combined in the proportion of about 1 to 7 parts of the former for each 5 parts of the latter, by weight. With other metallic salts than ferric chloride, the proportion of proteinous material to be added is increased or decreased so that the time required for the appearance of the first visible floc is approximately the same as that obtained with the foregoing proportions of proteinous material to ferric chloride.

Under some circumstances when adding the proteinous material-metallic salt combination to liquids, it is found advantageous to dilute a concentrated solution of the compound with ferric chloride or similar salt solution instead of with water. When this is done, we ordinarily use a compound containing a ratio of proteinous material to ferric chloride of 2 to 3, but the ratio in the diluted solution does not fall below 1 to 5. Even at this low ratio, the proteinous material combined with the ferric chloride or similar salt materially aids the flocculation of suspended solids.

Another example of a method of making a good coagulant is as follows. Dissolve gelatine in hot water, say 3 parts by weight of gelatine to 20 parts of water and then add the ferric chloride, say 2 parts. The mixture quickly stiffens and kneading is necessary to complete the reaction. The resulting pasty compound may be stored and shipped as such or dissolved in water or dried, preferably in the form of flakes. The dry product, the paste and even concentrated solutions are quite stable, non-hygroscopic and relatively non-corrosive. This solution if diluted to such a degree that one gallon of the liquor contains ¼ lb. of iron will remain stable indefinitely. If the composition is diluted to such an extent that 1 gallon contains 1/16 lb. of iron, it will remain stable for about two weeks. Higher dilutions will change in color from dark brown to yellow within about 24 hours and such solutions lose, to a large extent, their coagulating properties. Such highly diluted solutions are however stable for a few hours, say up to 10 hours, and the instability of the dilute solutions prepared for immediate use does not introduce a troublesome factor.

The coagulants of our invention may be applied to liquids to be clarified in the usual manner as will be understood by those skilled in the art. The coagulant ingredients may be fed separately or combined in solution form, or the compound may be fed in solid form. Usually, dilute solutions of the coagulant are easier to handle and can be fed in more accurate proportions to the liquid to be clarified. Some agitation of the liquid after addition of the coagulant is usually desirable since the floc settles very rapidly.

The clarification process and coagulants of our invention are particularly effective for the treatment of sewage and industrial wastes, but may also be used for general water coagulation processes. In some cases, however, it may be desirable to feed turbidity, i. e., clay or similar material, along with the coagulant or coagulant ingredients into the liquid to be treated in order to obtain the best results.

The proportion of coagulant required will vary with the liquid to be treated, the degree of treatment required, the composition of the coagulant, and many other factors. For treating average domestic sewage (approximately 200 P. P. M. total suspended solids and 200 P. P. M. B. O. D.) a suitable solution may be fed to provide in the sewage 4 to 8 parts of gelatine and 20 to 60 parts of ferric chloride per million. With more dilute sewages, lower concentrations may be used. In general, the proteinous material-metallic salt compound can be used with good results to provide only about 50 to 80% as much metal as would be required if the metallic salt were used alone.

Ordinarily in sewage treatment, the ferric chloride-gelatine combination works better at pH values below 7 than at pH values above 7. Its effectiveness increases with decreasing pH values within the range from about 8.0 down to pH 2.5. Above pH 8 the floc particles formed are smaller than at lower pH values and at a pH value of 11 the clarification of the sewage is definitely imperfect.

Perhaps the most important characteristic of the action of the metallic salt-proteinous material combination when operating conditions are normal is the character of the floc formed and its speed of formation. When the proteinous material and metallic salt are used jointly, observation indicates that the time required for the appearance of the first visible floc (under specified conditions of lighting, etc.) is substantially increased as compared with the time required for such floc appearance when the metallic salt is used alone. This makes it possible for the coagulating chemicals to be more thoroughly dispersed throughout the liquid before the actual clumping together of the small floc particles into larger floc aggregates takes place. Thus the smaller floc particles have a better opportunity to come in contact with the suspended and dissolved matter to be removed before the actual formation of the floc aggregates takes place. But the total time period for the formation of the first visible floc is extremely small compared with the time required for the entire coagulation process which may be said to include three stages, viz.: (a) formation of first visible floc, (b) clumping together of small floc particles into larger aggregates, and (c) settling of these floc aggregates with the occluded suspended and dissolved matter. However, once the floc has started to form, the clumping together into the larger aggregates proceeds more rapidly than in the case of the straight metallic salt and also the aggregates so formed are larger, more stable and tougher, so that they do not break up on being disturbed and even when broken up by violent stirring or pumping, reform and settle.

Sewage which has been properly treated with the composition has about the same B. O. D. and oxygen consumed values as sewage which has been properly treated with ferric chloride alone. This proves that the added proteinous material is removed with the floc and does not remain in the clarified effluent for, if it remained, these values would be higher.

The sludge formed maintains its flocculated form even after decomposition sets in and resists redispersion. Of the various proteinous materials, gelatine gives the largest reduction in the ferric chloride requirements for complete clarification of a sewage. Some other proteinous materials, however, give a large floc but impurities or non-proteinous materials present tend to dissolve in the sewage effluent and increase the oxygen demand. Others are satisfactory except for the fact that they fail to reduce appreciably the amount of ferric iron required for clarification over that necessary when $FeCl_3$ alone is employed.

Results similar to those obtained by the use of the described proteinous material-metallic salt combination may be obtained by proper use of proteinous material and metallic salt introduced separately into the liquor to be treated. For example, gelatine may be first added and thoroughly distributed and ferric chloride may then be added and quickly and thoroughly distributed. If the metallic salt is added before adding the proteinous material, e. g. about 1 minute earlier, the advantages of the combination are lost, and if the ingredients are added simultaneously, some advantage is obtained but the results are not as good as are obtained by using the proteinous material-metallic salt compound or by adding the proteinous material before the metallic salt. Even when the proteinous material is fed to the liquid before the metallic salt, however, it is necessary to control the ratio of proteinous material to metallic salt and this problem is eliminated by the use of the compound of the two ingredients.

The metallic salt-proteinous material combinations of our invention may be used, like ferric chloride and other coagulants, with additions of lime and other treating agents. Gelatine, whether added separately or in combination with ferric chloride, reduces the ferric chloride requirements but use of the combination definitely avoids the possibility of substantial quantities of the gelatine escaping flocculation and remaining the liquid effluent.

Sludge produced by the combination is more stable, remains amenable to dewatering longer and loses its dewatering characteristics more slowly than a ferric chloride sludge which, if allowed to stand too long, becomes gelatinous and must be treated, e. g., with lime and ferric chloride to restore its dewatering properties. The ferric chloride-gelatine sludge filters well and yields a firm non-gelatinous cake containing less water than a ferric chloride sludge. The proportions stated in the claims are in terms of parts by weight.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A coagulant for use in removing dissolved or suspended matter from liquids comprising ferric chloride and gelatine combined in the proportion of about 1 to 7 parts by weight of gelatine to 5 parts by weight of ferric chloride.

2. A coagulant for use in removing dissolved or suspended matter from liquids comprising about 1 to 2 parts by weight of a chloride of a trivalent metal combined with 1 part by weight of an albuminous protein.

3. A coagulant composition for use in removing dissolved or suspended matter from liquids comprising a compound of 5 parts by weight of a chloride of a trivalent metal chemically combined with about 1 to 7 parts by weight of an albuminous protein, said compound being dissolved in a dilute solution of hydrochloric acid.

4. A coagulant composition for use in removing dissolved or suspended matter from liquids comprising a compound of 5 parts by weight of a chloride of a trivalent metal chemically combined with about 1 to 7 parts by weight of gelatine, said compound being dissolved in a dilute solution of said salt.

5. A method of preparing a coagulant for use in removing dissolved or suspended matter from liquids comprising mixing in the presence of sufficient water to form a thick paste about 1 to 7 parts by weight of an albuminous protein with about 5 parts by weight of a chloride of a trivalent metal.

6. A method of preparing a coagulant for use in removing dissolved or suspended matter from liquids comprising grinding together 1 to 7 parts by weight of solid gelatine and 5 parts by weight of ferric chloride together with just sufficient water to form a pasty mass.

7. A method of making a coagulant for use in removing dissolved or suspended matter from liquids comprising dissolving about 3 parts by weight of gelatine in about 20 parts by weight of water, adding about 2 parts by weight of ferric chloride to the solution, and kneading the resulting pasty mass.

WILLEM RUDOLFS.
HARRY W. GEHM.